Figure 2:
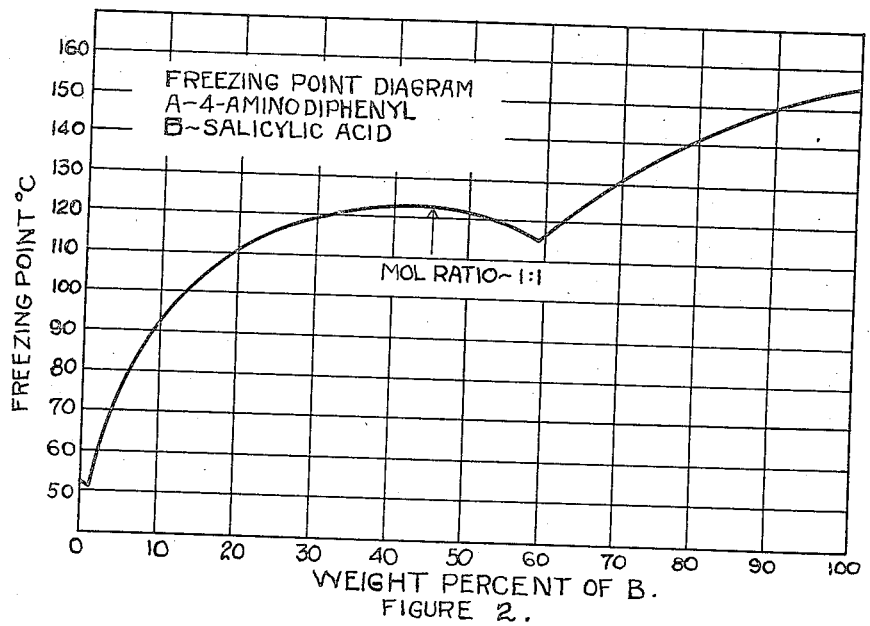

Nov. 30, 1937.   M. HARRIS   2,100,803

4-AMINODIPHENYL COMPOUNDS

Filed Jan. 24, 1935

INVENTOR
MORTON HARRIS
BY
Herbert J Krase
ATTORNEY

Patented Nov. 30, 1937

2,100,803

UNITED STATES PATENT OFFICE 2,100,803

4-AMINODIPHENYL COMPOUNDS

Morton Harris, Anniston, Ala., assignor, by mesne assignments, to Monsanto Chemical Company, a corporation of Delaware Application January 24, 1935, Serial No. 3,266

7 Claims. (Cl. 260—111)

This invention comprises molecular compounds of 4-aminodiphenyl and aromatic carboxylic compounds.

The object of this invention is to provide new compounds of 4-aminodiphenyl and (a) benzoic acid and (b) salicylic acid. Such compounds are useful as anti-oxidants, for disinfecting and preservative purposes, and other general chemical purposes where the amino and carboxylic grouping in complex form is desirable.

Reference is made to the accompanying drawing, the two figures of which illustrate the freezing points of several of the compounds which may be formed as well as the initial freezing points (or hold points) of compositions containing varying proportions of the complexes.

Figure 1:
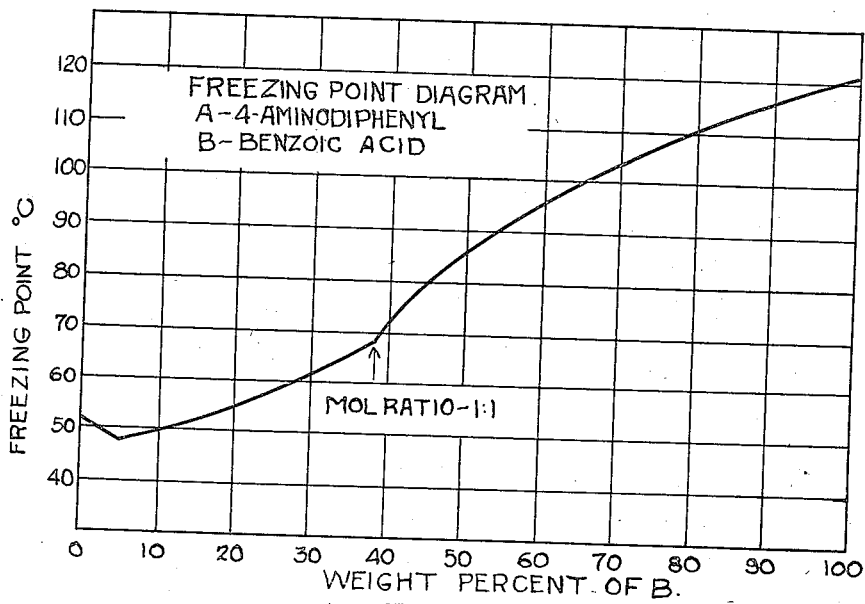

In the drawing:

Figure 1 shows the melting point range for the system: 4-aminodiphenyl, benzoic acid, and indicates a molecular compound of the type $NH_2(para) C_{12}H_9.C_6H_5CO_2H$, having a melting point of approximately 67° C. This material is a crystalline compound. This figure also illustrates the initial freezing points (or hold points) of compositions containing varying proportions of the compound together with one or the other of its constituent substances. The presence of a eutectic is indicated at the lower end of the curve.

Figure 2 shows the freezing point range for the system: 4-aminodiphenyl, salicylic acid, and indicates a molecular compound of the type $NH_2(para) C_{12}H_9.C_6H_4(OH) CO_2H$, having a melting point of approximately 122° C. This compound is crystalline. This figure also illustrates the melting points of compositions containing varying proportions of the compound together with one or the other of its constituent substances. The presence of two eutectics are indicated on this figure.

The compounds herein disclosed may be prepared by mixing together the constituent compounds in the proportion indicated, melting and then cooling the mixture. An alternate method is to effect the combination by mixing together solutions containing the constituent compounds and thereby causing the complex to precipitate from solution.

I have observed that the compounds described are less soluble in nearly all solvents than the constituent compounds thereof. This fact affords a ready means for removing from solution any one of the constituent compounds by the addition of a solution containing the requisite quantity of the other compound.

The molecular compound may be broken up by forming a salt of one of the constituents by the addition of either an alkali or an acid to the complex. Accordingly, I may add an acid to the complex and thereby form the acid salt of amine. If the acid salt formed is insoluble, I leach the acidified mixture with an appropriate solvent to remove the other constituent. By the choice of an appropriate solvent, I may separate either one of the constituents.

I have found that the property of forming compounds with 4-aminodiphenyl is possessed generally by compounds of the general formula:

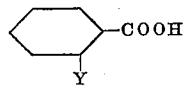

where Y is either hydrogen or the hydroxyl radical.

Having now particularly described my invention and the manner of compounding the same, it will be apparent that it is susceptible to various changes and modifications without departing from the spirit thereof, and I desire, therefore, that it be not limited except as indicated by the prior art or as set out in the appended claims.

What I claim is:

1. An addition compound of 4-aminodiphenyl and benzoic acid.

2. An addition compound of 4-aminodiphenyl and salicylic acid.

3. A crystalline compound of 4-aminodiphenyl and benzoic acid, said compound having a melting point of approximately 67° C.

4. A crystalline compound of 4-aminodiphenyl and salicylic acid, said compound having a melting point of approximately 122° C.

5. As a new chemical compound an addition product of 4-aminodiphenyl and an aromatic carboxylic acid selected from the group consisting of benzoic acid and salicylic acid.

6. A new chemical compound having the formula:

in which R—COOH represents an aromatic carboxylic acid selected from the group consisting of benzoic acid and salicylic acid.

7. An addition compound of 4-aminodiphenyl and an acid having the formula:

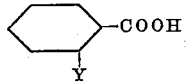

in which Y is a member of a group consisting of hydrogen and hydroxyl.

MORTON HARRIS.